(12) United States Patent
Jung et al.

(10) Patent No.: US 9,154,072 B2
(45) Date of Patent: Oct. 6, 2015

(54) MOTOR TORQUE CONTROL APPARATUS AND METHOD

(71) Applicants: Hyundai Motor Company, Seoul (KR); Kia Motors Corporation, Seoul (KR)

(72) Inventors: Jae Won Jung, Seoul (KR); Kyu-Il Lee, Yongin-si (KR); Sung-Gone Yoon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 125 days.

(21) Appl. No.: 14/098,256

(22) Filed: Dec. 5, 2013

(65) Prior Publication Data

US 2014/0184121 A1    Jul. 3, 2014

(30) Foreign Application Priority Data

Dec. 28, 2012 (KR) .................. 10-2012-0157486

(51) Int. Cl.
*H02K 17/32* (2006.01)
*H02P 23/04* (2006.01)

(52) U.S. Cl.
CPC ............ *H02P 23/04* (2013.01); *H02P 2205/05* (2013.01); *Y02T 10/7258* (2013.01)

(58) Field of Classification Search
CPC ... H02P 29/028; H02P 2205/05; H02P 23/04; H02P 25/088; H02P 6/002; G05B 2219/41383
See application file for complete search history.

(56) References Cited

U.S. PATENT DOCUMENTS 6,366,043 B1 * 4/2002 Stancu et al. ................. 318/432

FOREIGN PATENT DOCUMENTS

| JP | 2004-040993 A | 2/2004 |
| JP | 2010-206924 A | 9/2010 |
| KR | 1020080073768 A | 8/2008 |

* cited by examiner

*Primary Examiner* — Karen Masih
(74) *Attorney, Agent, or Firm* — McDermott Will & Emery LLP

(57) ABSTRACT

A motor torque control apparatus and method are provided for reducing jolting and noise caused by an acceleration or tip-in operation in an electric or fuel cell vehicle and for improving response to acceleration by the acceleration or tip-in operation. The motor torque control apparatus includes a limiter operative to limit a slew rate of a final torque signal applied to a motor of the vehicle based on a maximum slew rate selected from one of two previously-input slew rate variable maps. Specifically, L-mode and D-mode control units select the slew rate according to slew rate variable maps of an L mode and of D mode, respectively. A switch unit connects one of the L-mode and D-mode control units to the limiter based on a current operation state of the vehicle. The control units select the slew rate based on the torque signal output by the limiter.

7 Claims, 6 Drawing Sheets

MOTOR TORQUE CONTROL APPARATUS AND METHOD

CROSS-REFERENCE TO RELATED APPLICATION

This application claims priority to and the benefit of Korean Patent Application No. 10-2012-0157486 filed in the Korean Intellectual Property Office on Dec. 28, 2012, the entire contents of which are incorporated herein by reference.

TECHNICAL FIELD

The present disclosure relates to a motor torque control apparatus and method, and more particularly, to a motor torque control apparatus and method for controlling torque of a motor mounted as a power source in an electric vehicle or a fuel cell vehicle.

BACKGROUND

In general, electric vehicles and fuel cell vehicles include a motor. The motor is used as a power source of the electric vehicle and the fuel cell vehicle. Furthermore, the electric vehicle and the fuel cell vehicle include a motor control unit (MCU) to control torque of the motor.

During an acceleration or tip-in operation using an accelerator of the electric vehicle or the fuel cell vehicle, jolting and noise may occur and thereby degrade ride comfort. In particular, when an acceleration or tip-in operation is performed while the electric vehicle or the fuel cell vehicle is driven at low speed using regenerative braking, a large jolt and noise may be occur as a result of the acceleration or tip-in operation.

Therefore, there is a demand for a motor torque control apparatus and method which is capable of reducing jolting and noise caused by a tip-in operation, using an MCU.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a motor torque control apparatus and method which is capable of reducing jolting and noise caused by a tip-in operation. The present disclosure has also been made in an effort to provide a motor torque control apparatus and method which is capable of improving response to acceleration resulting from a tip-in operation and minimizing jolting caused by the tip-in operation.

An exemplary embodiment of the present disclosure provides a motor torque control apparatus including: a limiter receiving an input torque signal, and outputting an intermediate torque signal corresponding to the input torque signal having a limited slew rate when torque of a motor of a vehicle is requested to be increased according to the input torque signal; an L-mode control unit selecting a slew rate for use by the limiter according to a previously-input slew rate variable map of an L mode; a D-mode control unit selecting a slew rate for use by the limiter according to a previously-input slew rate variable map of a D mode; and a switch unit selectively connecting one of the L-mode control unit and the D-mode control unit to the limiter.

The limiter may output the intermediate torque signal having a slew rate that does not exceed the slew rate selected by the one of the L-mode control unit or the D-mode control unit that is connected to the limiter by the switch unit.

The intermediate torque signal output by the limiter may be fed back to the D-mode control unit and the L-mode control unit such that each of the D-mode control unit or the L-mode control unit select the slew rate according to the intermediate torque signal and a respective one of the slew rate variable map of the D mode and the slew rate variable map of the L mode.

The motor torque control apparatus may further include a determination unit determining whether a current operation state of the vehicle is the L mode or the D mode. The switch unit may selectively connect the one of the L-mode control unit and the D-mode control unit to the limiter according to the current operation state of the vehicle determined by the determination unit.

Another exemplary embodiment of the present disclosure provides a motor torque control method including: limiting a slew rate of an input torque signal in a slew rate limiter, by outputting an intermediate torque signal corresponding to the input torque signal having a limited slew rate when torque of a motor of a vehicle is requested to be increased according to the input torque signal; feeding back the intermediate torque signal to a control unit operative to select the slew rate used by the slew rate limiter; and outputting the intermediate torque signal controlled having the limited slew rate for use in controlling the torque of the motor of the vehicle.

The motor torque control method may further include determining whether an operation state of the vehicle is the L mode or the D mode, and either feeding back the intermediate torque signal to a control unit operative to select the slew rate using a predetermined map according to the D mode when the operation state of the vehicle is the D mode, or feeding back the intermediate torque signal to a control unit operative to select the slew rate using a predetermined map according to the L mode when the operation state of the vehicle is the L mode.

The limiting of the slew rate may include limiting of the slew rate of the input torque signal to the slew rate selected using the predetermined map according to the D mode when the operation state of the vehicle is the D mode, or limiting of the slew rate of the input torque signal to the slew rate selected using the predetermined map according to the L mode when the operation state of the vehicle is the L mode.

<Description of symbols>

Figure 1:
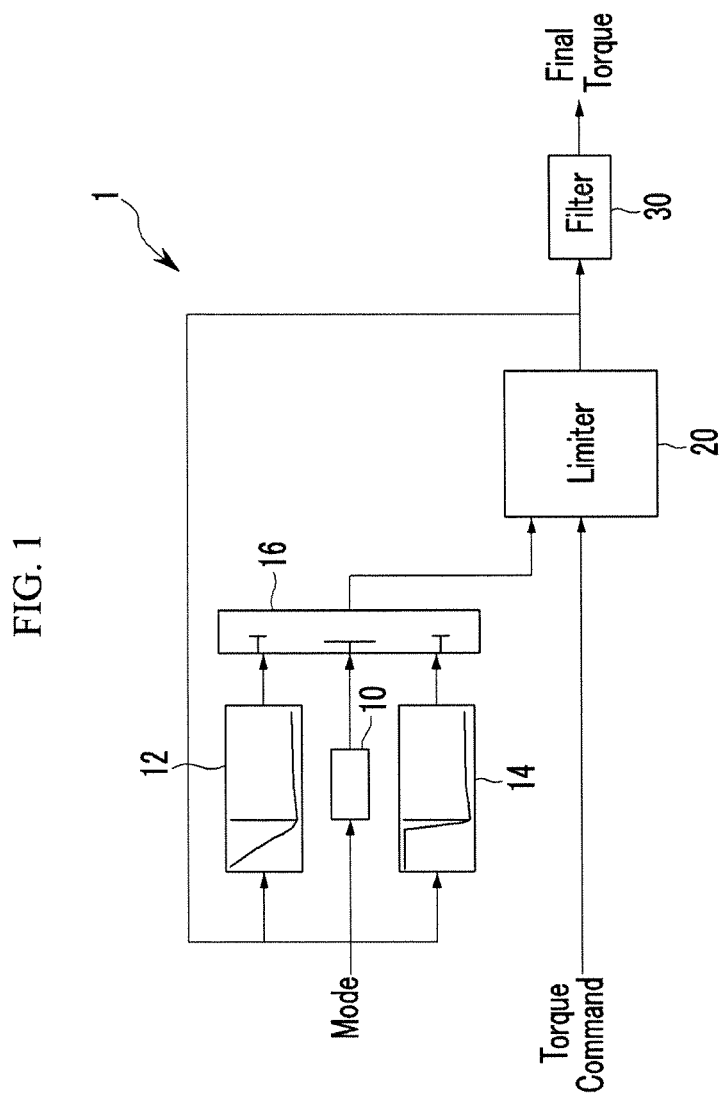
FIG. 1 is a configuration diagram of a motor torque control apparatus according to an exemplary embodiment of the present disclosure.

1: Motor torque control apparatus
12: L-mode control unit
16: Switch unit
30: Torque filter
10: Determination unit
14: D-mode control unit
20: Limiter

DETAILED DESCRIPTION

An exemplary embodiment of the present disclosure will hereinafter be described in detail with reference to the accompanying drawings.

FIG. 1 is a configuration diagram of a motor torque control apparatus according to an exemplary embodiment of the present disclosure.

As illustrated in FIG. 1, the motor torque control apparatus 1 according to the exemplary embodiment of the present disclosure includes a limiter 20, a torque filter 30, an L-mode control unit 12, a D-mode control unit 14, a determination unit 10, and a switch unit 16.

The limiter 20 receives a torque command input to the motor torque control apparatus 1. The torque command is input to the motor torque control apparatus 1 from an accelerator when a driver operates the accelerator (not illustrated) of a vehicle. The operating of the accelerator to cause the vehicle to accelerate is referred to as a 'tip-in' operation. The input torque is torque of a motor (not illustrated) which is used to accelerate the vehicle. Therefore, the motor torque control apparatus 1 controls the motor to increase the torque of the motor according to the input torque command.

The motor torque control apparatus 1 is a type of motor control unit (MCU). A driver operates the accelerator in order to input the torque command to the MCU.

The limiter 20 limits a slew rate when the torque of the motor is increased. Specifically, the slew rate is limited such that the slope of increase in the torque of the motor decreases continuously with time. The slew rate is a maximum value of variation in output voltage (or variation in an intermediate torque command that is output by the limiter 20) with respect to time. That is, as an output voltage (or intermediate torque command) operative to cause rotation of the motor is limited from rapidly increasing, the torque of the motor is prevented from being rapidly increased.

The torque filter 30 receives a signal for increasing the torque of the motor from the limiter 20. The signal received from the limiter 20 is a intermediate torque command signal that has the limited slew rate. Furthermore, the torque filter 30 removes noise from the intermediate torque command signal received from the limiter 20, and outputs an output final torque signal. The torque of the motor is controlled according to the output final torque signal.

When the intermediate torque command signal is transmitted to the torque filter 30 from the limiter 20, a part of the intermediate torque command signal is fed back to each of the L-mode control unit 12 and the D-mode control unit 14.

The L-mode control unit 12 controls the slew rate according to a slew rate variable map which is applied while the vehicle is driven in the L mode. Furthermore, the D-mode control unit 14 controls the slew rate according to a slew rate variable map which is applied while the vehicle is driven in the D mode. The slew rate variable maps of the L mode and the D mode may include predetermined data which are previously input to and stored in the motor torque control apparatus 1.

Meanwhile, the L mode indicates a state in which the vehicle is driven at a relatively low speed by regenerative braking (e.g., a state in which the vehicle is generating power using regenerative braking), and the D mode indicates a general operation state of the vehicle which is less influenced by regenerative braking (e.g., a state in which the vehicle is not generating power using regenerative braking).

The determination unit 10 determines whether the current operation state of the vehicle is the L mode or the D mode. The determination unit 10 receives information on the current operation state of the vehicle, which is detected by a sensor (not illustrated), from the sensor. The determination unit 10 causes one of the L-mode control unit 12 or the D-mode control unit 14 to operate according to the determination result indicative of whether the vehicle is operating in the L mode or the D mode. The determination of whether the vehicle is operating in the L mode or the D mode may be set according to the intention of a person operating the vehicle.

The switch unit 16 connects the output of one of the L-mode control unit 12 and the D-mode control unit 14 to an input of the limiter 20 according to the determination of the determination unit 10. When the output of the L-mode control unit 12 and the input of the limiter 20 are connected, the fed-back intermediate torque command signal is used to select a corresponding slew rate in the L-mode control unit 12 according to the slew rate variable map of the L mode. The selected slew rate is then transmitted from the L-mode control unit 12 to the limiter 20, and is used by the limiter 20 to limit the slew rate of the intermediate torque command signal output by the limiter 20. When the output of the D-mode control unit 14 and the input of the limiter 20 are connected, the fed-back intermediate torque command signal is used to selected a corresponding slew rate in the D-mode control unit 14 according to the slew rate variable map of the D mode. The selected slew rate is then transmitted from the D-mode control unit 14 to the limiter 20, and is used by the limiter to limit the slew rate of the intermediate torque command signal output by the limiter 20.

The selected slew rate signal transmitted to the limiter 20 from the L-mode control unit 12 or the D-mode control unit 14 controls the maximum slew rate applied by the limiter 20 to the torque command signal received by the limiter 20. The intermediate torque command signal output from the limiter 20 to the torque filter 30 thus has a slew rate not exceeding the selected slew rate received from the L-mode control unit 12 or from the D-mode control unit 14. A part of the torque signal at the output of the limiter 20 is then fed back to the L-mode control unit 12 and the D-mode control unit 14.

Figure 2:
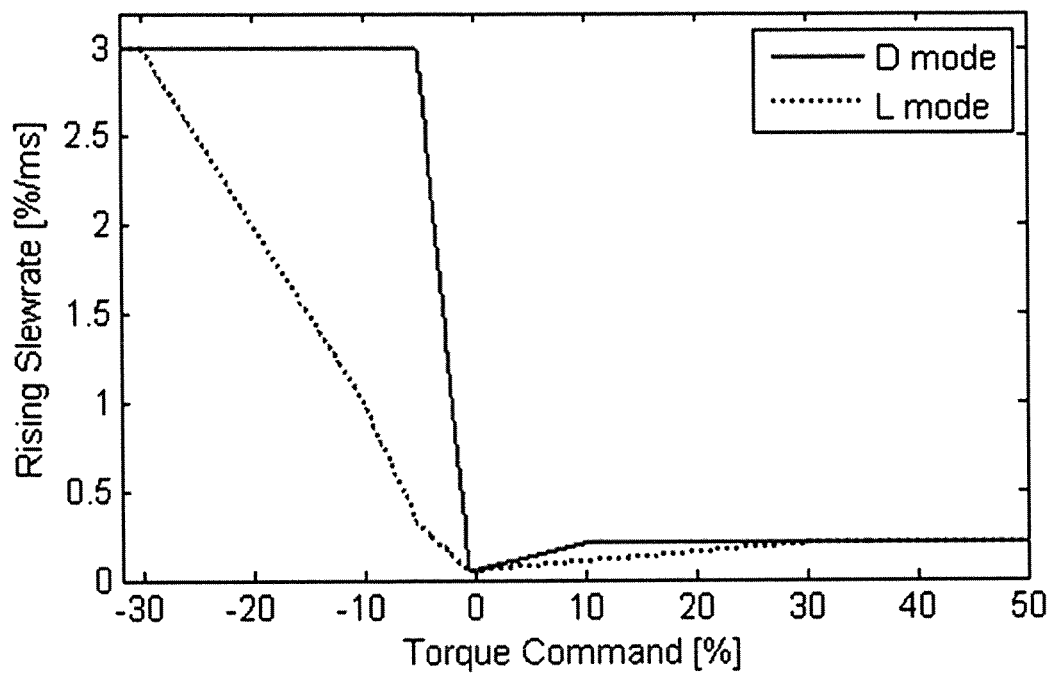
FIG. 2 is a graph illustrating slew rate variable maps of a D mode and an L mode.

FIG. 2 is a graph illustrating the slew rate variable maps of the D mode and the L mode.

As illustrated in FIG. 2, the slew rate variable map of the D mode and the slew rate variable map of the L mode are different from each other. Furthermore, the slew rate variable maps of the D mode and the L mode may be set through experimentation such that jolting and noise caused by a tip-in operation are reduced and response to acceleration caused by a tip-in operation is improved.

Figure 3:
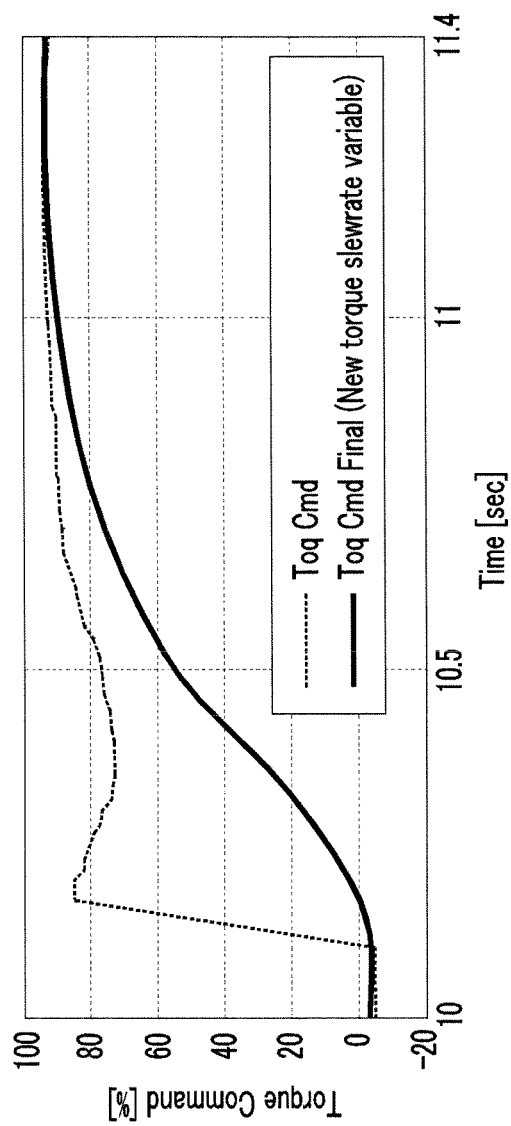
FIG. 3 is a graph illustrating motor torque control of the D mode.
Figure 4:
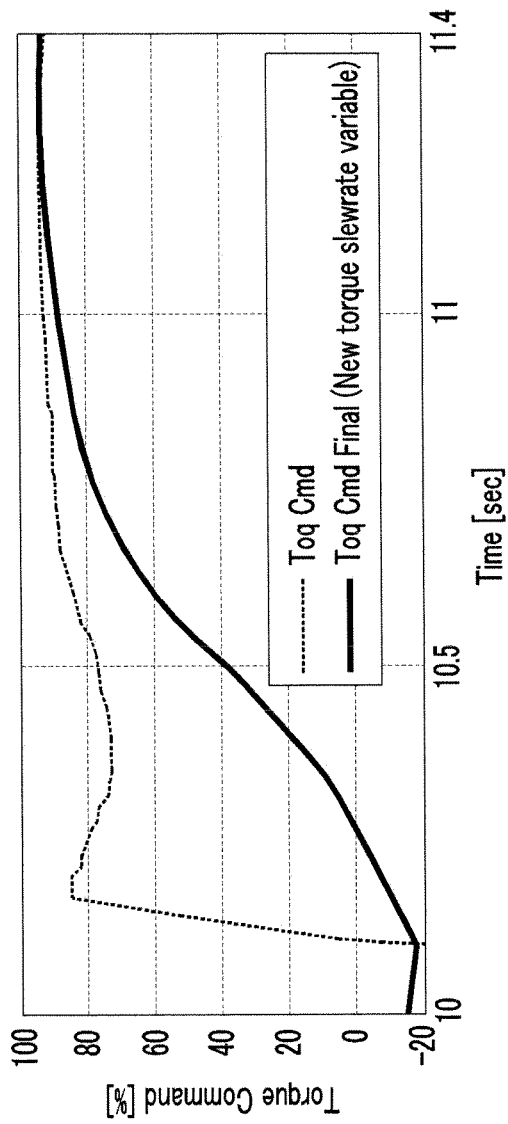
FIG. 4 is a graph illustrating motor torque control of the L mode.

FIG. 3 is a graph illustrating motor torque control of the D mode, and FIG. 4 is a graph illustrating motor torque control of the L mode. In FIGS. 3 and 4, a dotted line indicates input torque command based on a tip-in operation, and a solid line indicates final torque output from the motor torque control apparatus 1.

As illustrated in FIGS. 3 and 4, the final torque is slowly increased while the input torque command is rapidly increased by a tip-in operation. Furthermore, while the final torque is increased, a section in which the final torque is rapidly increased emerges. Therefore, it is possible to reduce a time required until the final torque and the input torque command are equalized to each other. That is, the response to acceleration by a tip-in operation may be improved.

Meanwhile, the motor torque control of the L mode (see, e.g., FIG. 4) is set in such a manner that a time required until the final torque and the input torque command are equalized to each other is longer than in the motor torque control of the D mode (see, e.g., FIG. 3). Therefore, although the response to acceleration by a tip-in operation in the L mode is degraded in comparison with the response to acceleration in the D mode, jolting and noise caused by the tip-in operation may be effectively reduced.

Figure 5:
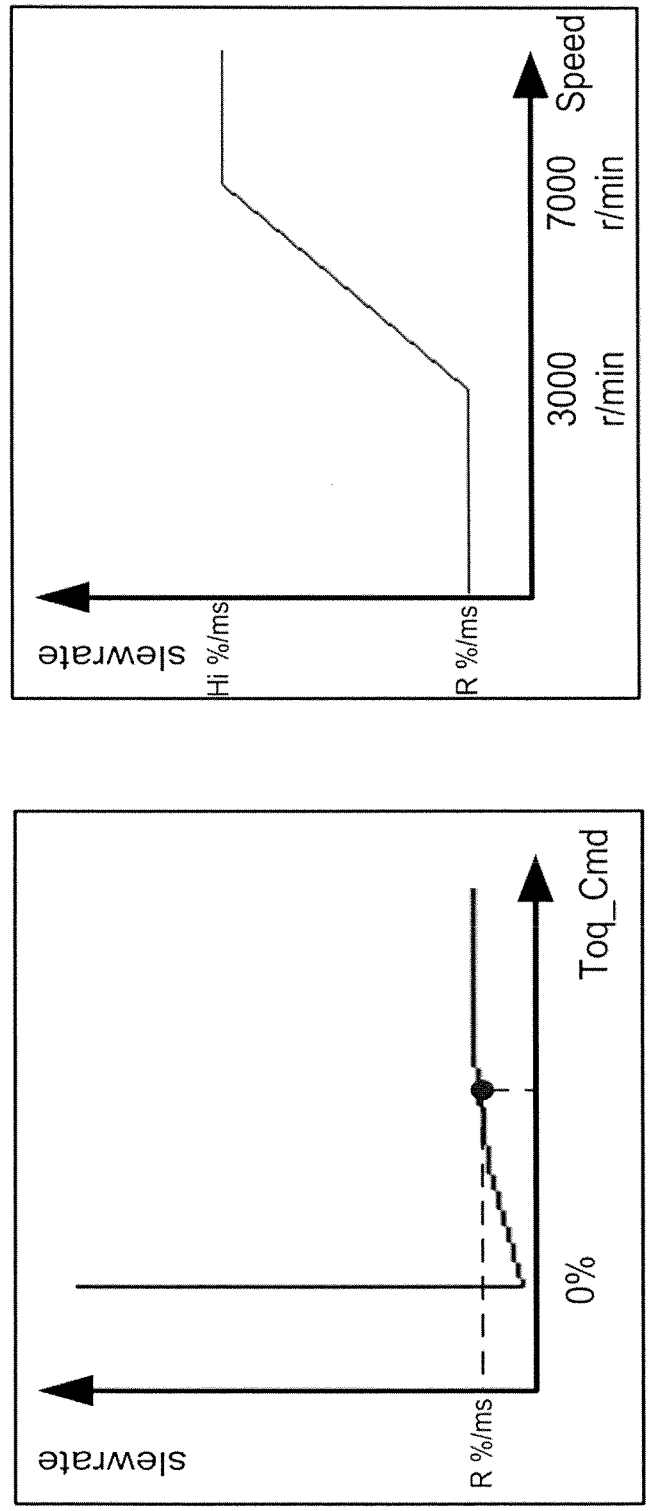
FIG. 5 is a graph illustrating motor torque control by feedback of the torque signal.

FIG. 5 is a graph illustrating motor torque control by feedback of the torque signal.

As illustrated in FIG. 5, the slew rate is limited according to a primary variable map so as to reduce jolting and noise caused by a tip-in operation. A maximum value of the limited slew rate is set through feedback. Furthermore, the maximum value of the limited slew rate becomes a minimum value according to a secondary variable map, and the slew rate is gradually increased from the limited slew rate as vehicle speed is increased. Therefore, the response to acceleration by a tip-in operation is restored.

Figure 6:
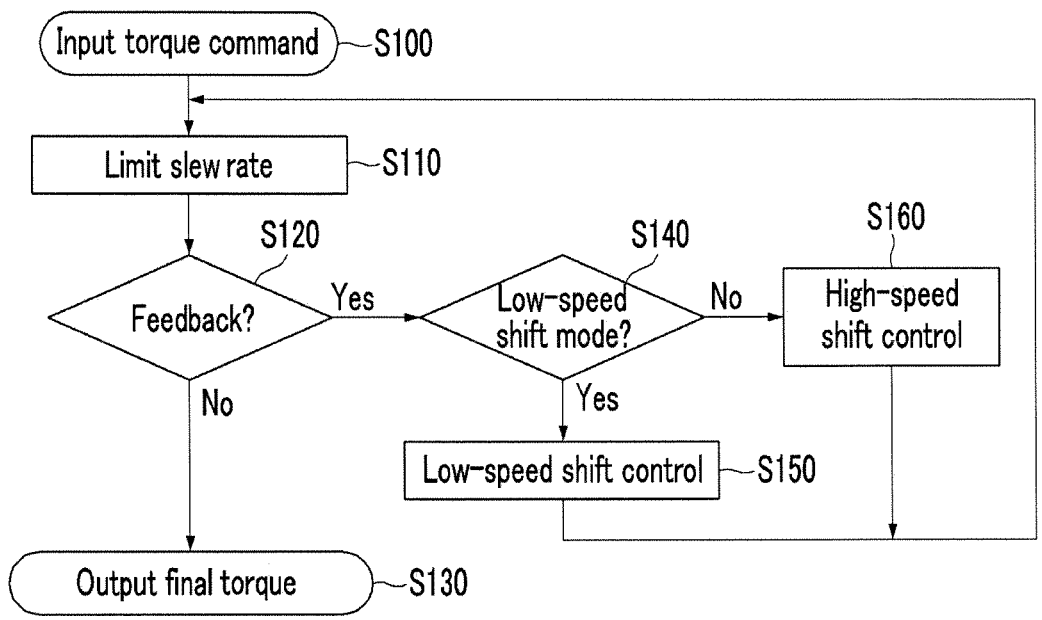
FIG. 6 is a flowchart of a motor torque control method according to the exemplary embodiment of the present disclosure.

FIG. 6 is a flowchart of a motor torque control method according to the exemplary embodiment of the present disclosure.

As illustrated in FIG. 6, when input torque command is input to the motor torque control apparatus 1 (S100), the limiter 20 of the motor torque control apparatus 1 limits a slew rate for controlling the motor to approach the input torque command (S110).

The intermediate torque command changed according to the limited slew rate is transmitted to the torque filter 30 from the limiter 20. Furthermore, a part of the intermediate torque command transmitted from the limiter 20 to the torque filter 30 is fed back to the L-mode control unit 12 and the D-mode control unit 14 of the motor torque control apparatus 1 (S120). Furthermore, noise of the intermediate torque command transmitted from the limiter 20 to the torque filter 30 is removed by the torque filter 30 (S130), and the output final torque is output from the torque filter 30.

FIG. 6 illustrates that feedback is determined at step S120. However, FIG. 6 illustrates the process in which step S130 is performed on the intermediate torque command transmitted to the torque filter 30, and step S140 is performed based on a part of the fed-back intermediate torque command.

The determination unit 10 of the motor torque control apparatus 1 determines whether the operation state of the vehicle is the L mode or the D mode (S140).

When it is determined that the operation state of the vehicle is the L mode, the fed-back intermediate torque command is processed by the L-mode control unit 12 (S150), and the procedure returns to step S110.

When it is determined that the operation state of the vehicle is the D mode, the fed-back intermediate torque command is processed by the D-mode control unit 14 (S160), and the procedure returns to step S110.

According to the above-described exemplary embodiment of the present disclosure, the torque of the motor is controlled through the slew rate, which makes it possible to effectively reduce jolting and noise caused by a tip-in operation. Furthermore, the calculated torque is fed back to control the slew rate of the output final torque signal used to control the motor. Accordingly, the response to acceleration by a tip-in operation may be improved. Furthermore, ride comfort may be improved.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A motor torque control apparatus comprising:
    a limiter receiving an input torque signal, and outputting an intermediate torque signal corresponding to the input torque signal having a limited slew rate when torque of a motor of a vehicle is requested to be increased according to the input torque signal;
    an L-mode control unit selecting a slew rate for use by the limiter according to a previously-input slew rate variable map of an L mode;
    a D-mode control unit selecting a slew rate for use by the limiter according to a previously-input slew rate variable map of a D mode; and
    a switch unit selectively connecting one of the L-mode control unit and the D-mode control unit to the limiter.

2. The motor torque control apparatus of claim 1, wherein:
    the limiter outputs the intermediate torque signal having a slew rate that does not exceed the slew rate selected by the one of the L-mode control unit or the D-mode control unit that is connected to the limiter by the switch unit.

3. The motor torque control apparatus of claim 2, wherein:
    the intermediate torque signal output by the limiter is fed back to the D-mode control unit and the L-mode control unit such that each of the D-mode control unit or the L-mode control unit select the slew rate according to the intermediate torque signal and a respective one of the slew rate variable map of the D mode and the slew rate variable map of the L mode.

4. The motor torque control apparatus of claim 1, further comprising:
    a determination unit determining whether a current operation state of the vehicle is the L mode or the D mode,
    wherein the switch unit selectively connects the one of the L-mode control unit and the D-mode control unit to the limiter according to the current operation state of the vehicle determined by the determination unit.

5. A motor torque control method comprising:
    limiting a slew rate of an input torque signal in a slew rate limiter, by outputting an intermediate torque signal corresponding to the input torque signal having a limited slew rate when torque of a motor of a vehicle is requested to be increased according to the input torque signal;
    feeding back the intermediate torque signal to a control unit operative to select the slew rate used by the slew rate limiter; and
    outputting the intermediate torque signal having the limited slew rate for use in controlling the torque of the motor of the vehicle.

6. The motor torque control method of claim 5, further comprising:
    determining whether an operation state of the vehicle is the L mode or the D mode,
    wherein the feeding back of the intermediate torque signal comprises feeding back the intermediate torque signal to a control unit operative to select the slew rate using a predetermined map according to the D mode when the operation state of the vehicle is the D mode, and
    wherein the feeding back of the intermediate torque signal comprises feeding back the intermediate torque signal to a control unit operative to select the slew rate using a predetermined map according to the L mode when the operation state of the vehicle is the L mode.

7. The motor torque control method of claim 6, wherein:

the limiting of the slew rate comprises limiting of the slew rate of the input torque signal to the slew rate selected using the predetermined map according to the D mode when the operation state of the vehicle is the D mode, and the limiting of the slew rate comprises limiting of the slew rate of the input torque signal to the slew rate selected using the predetermined map according to the L mode when the operation state of the vehicle is the L mode.

* * * * *